(12) United States Patent
Mizuguchi (10) Patent No.: US 10,640,032 B2
(45) Date of Patent: May 5, 2020

(54) OPTICAL AXIS ADJUSTMENT DEVICE (71) Applicant: Toyota Jidosha Kabushiki Kaisha, Toyota-shi, Aichi-ken (JP)

(72) Inventor: Ko Mizuguchi, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/223,814

(22) Filed: Dec. 18, 2018

(65) Prior Publication Data
US 2019/0210512 A1 Jul. 11, 2019

(30) Foreign Application Priority Data

Jan. 9, 2018 (JP) .................................. 2018-001054

(51) Int. Cl.
*B60Q 1/06* (2006.01)
*B25B 15/00* (2006.01)
*B25B 27/00* (2006.01)
*B25B 13/48* (2006.01)

(52) U.S. Cl.
CPC .............. *B60Q 1/06* (2013.01); *B25B 13/481* (2013.01); *B25B 15/004* (2013.01); *B25B 27/0035* (2013.01); *B25B 15/005* (2013.01)

(58) Field of Classification Search
CPC ................................ B25B 15/005; B60Q 1/06
See application file for complete search history.

(56) References Cited

U.S. PATENT DOCUMENTS

2016/0130049 A1* 5/2016 Rogers ............... B65D 47/0842
215/201

FOREIGN PATENT DOCUMENTS

JP H09301053 A 11/1997
JP 2011-204422 A 10/2011

* cited by examiner

*Primary Examiner* — Joseph L Williams
*Assistant Examiner* — Jacob R Stern
(74) *Attorney, Agent, or Firm* — Dinsmore & Shohl LLP (57) ABSTRACT

An optical axis adjustment device that adjusts an optical axis of a headlamp includes an aiming screw that is provided extending from inside to outside the headlamp and that has an operation portion outside the headlamp, and an aiming guide. The aiming guide is disposed outside the headlamp and includes: a cover portion that covers the operation portion of the aiming screw; a guide portion that has a tool insertion space inside and that is provided extending linearly from the cover portion; and a locking cap portion that is provided on an end portion of the guide portion away from the cover portion and that is configured to cover an opening of the tool insertion space.

9 Claims, 9 Drawing Sheets

OPTICAL AXIS ADJUSTMENT DEVICE

CROSS-REFERENCE TO RELATED APPLICATIONS

This application claims priority to Japanese Patent Application No. 2018-001054 filed on Jan. 9, 2018, which is incorporated herein by reference in its entirety including the specification, drawings and abstract.

BACKGROUND

1. Technical Field

The disclosure relates to an optical axis adjustment device that adjusts an optical axis of a headlamp of a vehicle.

2. Description of Related Art

Japanese Patent Application Publication No. 2011-204422 (JP 2011-204422 A) discloses a technique of forming, in a bulging portion provided on a rear surface of a housing of a headlamp, an insertion hole in which a tool for operating an aiming screw (aiming gear) of an optical axis adjustment device is passed through. Even when the aiming screw is disposed below etc. the bulging portion, the tool can be inserted in the through hole so that the tool is able to access and operate the aiming screw.

However, there are the following problems in a front structure of a vehicle disclosed in JP 2011-204422 A. There is a possibility that the front structure cannot conform to a regulation of "prohibition of lateral optical axis adjustment by user" stipulated by the North American Regulations (Federal Motor Vehicle Safety Standards (FMVSS)) since the aiming screw is exposed from a rear surface of the housing of the headlamp to outside the housing.

In order to satisfy the FMVSS, it is conceivable to eliminate the aiming screw. However, if the aiming screw is eliminated, variation of the optical axis with respect to the lateral direction which occurs when the headlamp is manufactured cannot be adjusted. Thus there is room for improvement in headlamp nighttime visibility.

SUMMARY

The disclosure provides an optical axis adjustment device in consideration of the FMVSS, which is provided with an aiming screw.

An aspect of the disclosure relates to an optical axis adjustment device that adjusts an optical axis of a headlamp. The optical axis adjustment device includes an aiming screw that is provided extending from inside to outside the headlamp and that has an operation portion outside the headlamp, and an aiming guide. The aiming guide is disposed outside the headlamp and includes: a cover portion that covers the operation portion of the aiming screw; a guide portion that has a tool insertion space inside and that is provided extending linearly from the cover portion; and a locking cap portion that is provided on an end portion of the guide portion away from the cover portion and that is configured to cover an opening of the tool insertion space.

With the above configuration, it is possible to obtain the following effects.

(a) The aiming guide is provided and the aiming guide has the cover portion that covers the operation portion of the aiming screw. Thus, it is possible to suppress the operation portion of the aiming screw from being exposed. Therefore, it is possible to make it difficult for a user to operate the aiming screw and adjust the optical axis.

(b) The aiming guide has the cover portion that covers the operation portion of the aiming screw, and the guide portion that has the tool insertion space inside and that is provided extending linearly from the cover portion. Thus, it is possible for the tool to access the operation portion of the aiming screw only through the guide portion.

(c) The aiming guide has the locking cap portion that is provided on the end portion of the guide portion away from the cover portion and that is able to cover the opening of the tool insertion space. Thus, at a vehicle factory, after the optical axis is adjusted by the tool accessing the aiming screw through the tool insertion space of the guide portion, the locking cap portion is closed and the opening of the tool insertion space is covered by the locking cap portion. Therefore, it is possible to restrain the user from accessing the aiming screw.

According to (a) to (c) of the above, with the locking cap portion, it is possible to restrain the user from accessing the aiming screw even when the aiming screw is disposed. Thus, the optical axis adjustment device can be provided with more consideration given to the FMVSS compared to a device of the related art.

In the aspect described above, the locking cap portion may be integral with the guide portion and may be joined with the guide portion by integral hinging.

With the above configuration, it is possible to obtain the following effects. The locking cap portion is joined with the guide portion by integral hinging. Thus, compared to the case where the locking cap portion is formed separately from the guide portion, it is possible to not just reduce the number of assembly parts of the device, but also restrain the locking cap portion from falling off the guide portion.

In the aspect described above, the guide portion may have a protruding piece that protrudes from a peripheral portion of the opening away from the cover portion.

With the above configuration, it is possible to obtain the following effects. The guide portion has the protruding piece. Therefore, it is possible to protect the locking cap portion in a closed state from its surroundings with the protruding piece. This can suppress the closed state of the locking cap portion from being released by outer force applied to the locking cap portion in the closed state.

In the aspect described above, a tab may be provided on one of the locking cap portion and the protruding piece of the guide portion, and a tab receiver configured to be engaged with the tab may be provided on the other of the locking cap portion and the protruding piece of the guide portion.

With the above configuration, it is possible to obtain the following effects. The tabs are provided on one of the locking cap portion and the protruding piece of the guide portion. The tab receivers which can be engaged with the tabs are provided on the other of the locking cap portion and the protruding piece of the guide portion. Thus, it is possible to maintain the closed state of the locking cap portion by just engaging the tabs with the tab receivers. Therefore, it is possible to maintain the closed state of the locking cap portion with a simple configuration. Additionally, since the tabs or the tab receivers are provided on the protruding piece, the tabs and the tab receivers can be engaged by deflecting the protruding piece, and the tabs and the tab receivers can be easily engaged.

In the aspect described above, the protruding piece may have first, second, and third protruding pieces along the peripheral portion of the opening in this order. Among the first, second, and third protruding pieces, the first and third protruding pieces may be provided so as to face each other and may be provided with the tab or the tab receiver, and the second protruding piece may be positioned ahead of an end portion of the locking cap portion in the closed state, the end portion being on an opposite side of the locking cap portion from a side on which the locking cap portion is joined with the guide portion by integral hinging.

With the above configuration, it is possible to obtain the following effects. The tabs or the tab receivers are provided on the first and third protruding pieces that are provided so as to face each other. Thus, it is possible to engage the locking cap portion with the protruding piece at both right and left sides of the locking cap portion and therefore perform engagement surely and firmly. The second protruding piece is positioned ahead of the end portion of the locking cap portion in the closed state. Thus, it is possible to protect the locking cap portion in the closed state with the second protruding piece, and the locking cap portion can be made more difficult to open compared to the case where the second protruding piece is not provided.

In the aspect described above, the protruding piece may have the first, second, and third protruding pieces along the peripheral portion of the opening in this order. Among the first, second, and third protruding pieces, the second protruding piece may be positioned ahead of the end portion of the locking cap portion in the closed state, the end portion being on an opposite side of the locking cap portion from a side on which the locking cap portion is joined with the guide portion by integral hinging, and is provided with the tab or tab receiver, and the first and third protruding pieces are provided facing each other and are positioned on both sides of the locking cap portion in the closed state.

With the above configuration, it is possible to obtain the following effects. The tab or the tab receiver is provided on the second protruding piece that is positioned ahead of the end portion of the locking cap portion. Thus, the locking cap portion can be engaged with the protruding piece by the end portion of the locking cap portion. Therefore, only one tab needs to be engaged with one tab receiver and it is possible to suppress a state in which only the tab and the tab receiver on one side are engaged, as is not the case in which the tabs and the tab receivers are provided on both right and left sides of the locking cap portion. Additionally, the first and third protruding pieces are positioned on both sides (right and left sides) of the locking cap portion in the closed state. Thus, the locking cap portion in the closed state can be protected by the first and third protruding pieces and the locking cap portion can be made more difficult to open compared to the case where the first and third protruding pieces are not provided.

In the aspect described above, the guide portion may be provided extending vertically upward or obliquely upward from the cover portion.

With the above configuration, it is possible to obtain the following effects. The guide portion is provided extending vertically upward or obliquely upward from the cover portion. Thus, not only is it possible to dispose the locking cap portion on the upper portion of the headlamp, but it is also possible to open the tool insertion space of the guide portion vertically upward or obliquely upward. This facilitates access to the locking cap portion at the vehicle factory, as well as allows the tool to be inserted in the tool insertion space from vertically upward or obliquely upward. Thus, workability of the optical axis adjustment operation at the vehicle factory can be improved.

In the aspect described above, the aiming guide may have a mounting portion for mounting the aiming guide to the headlamp.

With the above configuration, it is possible to obtain the following effects. The aiming guide has the mounting portion for mounting the aiming guide to the headlamp. Thus, it is possible to suppress the aiming guide from falling off the headlamp.

In the aspect described above, the optical axis adjustment device may be configured to adjust the optical axis of the headlamp in a lateral direction of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An optical axis adjustment device of an embodiment of the disclosure will be described with reference to the drawings. In the figures, "UP" indicates an upward direction, "FR" indicates a forward direction relative to a vehicle, and "OUT" indicates an outward direction along a vehicle width direction.

Figure 1:
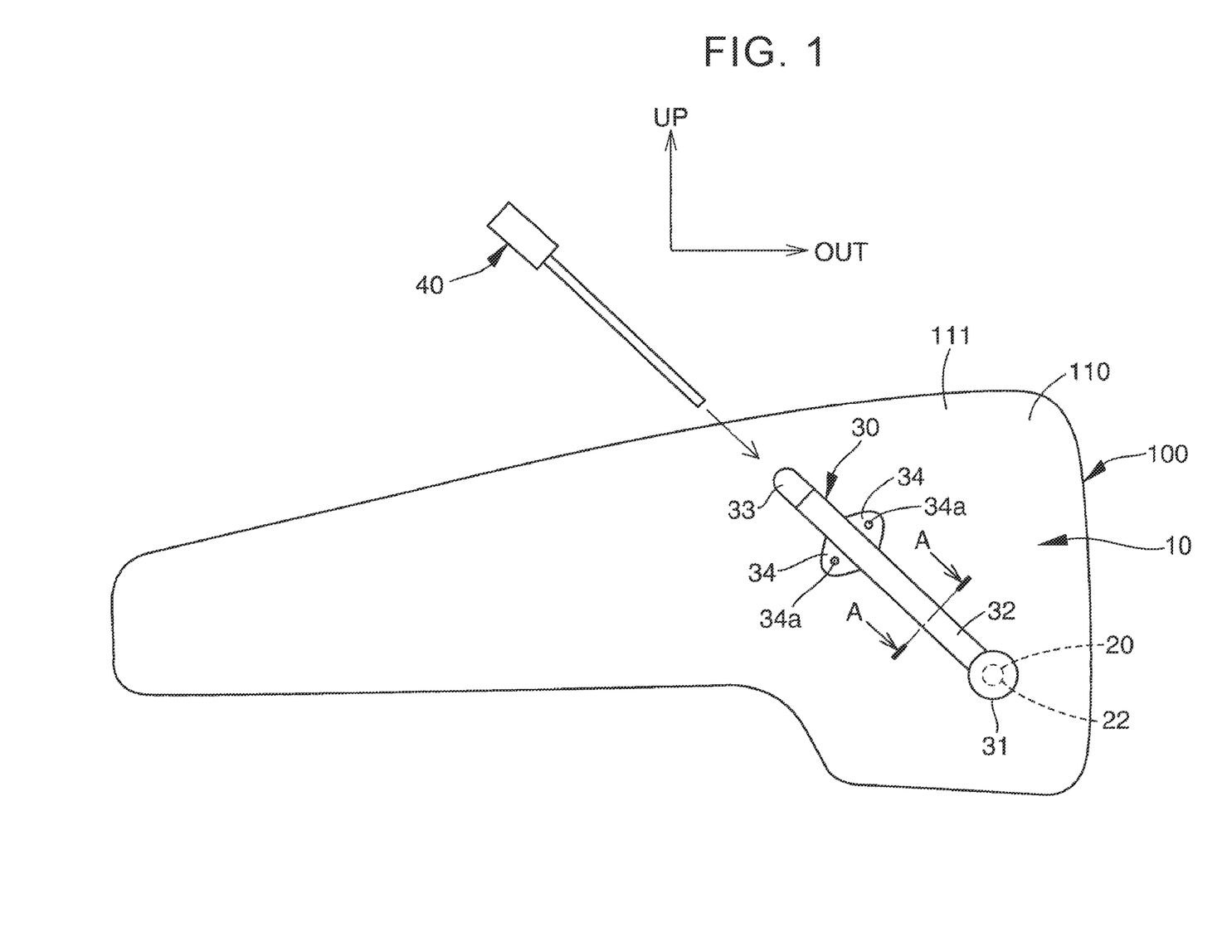
FIG. 1 is a schematic rear view of an optical axis adjustment device according to an embodiment of the disclosure, with an aiming guide mounted on the headlamp.
Figure 2:
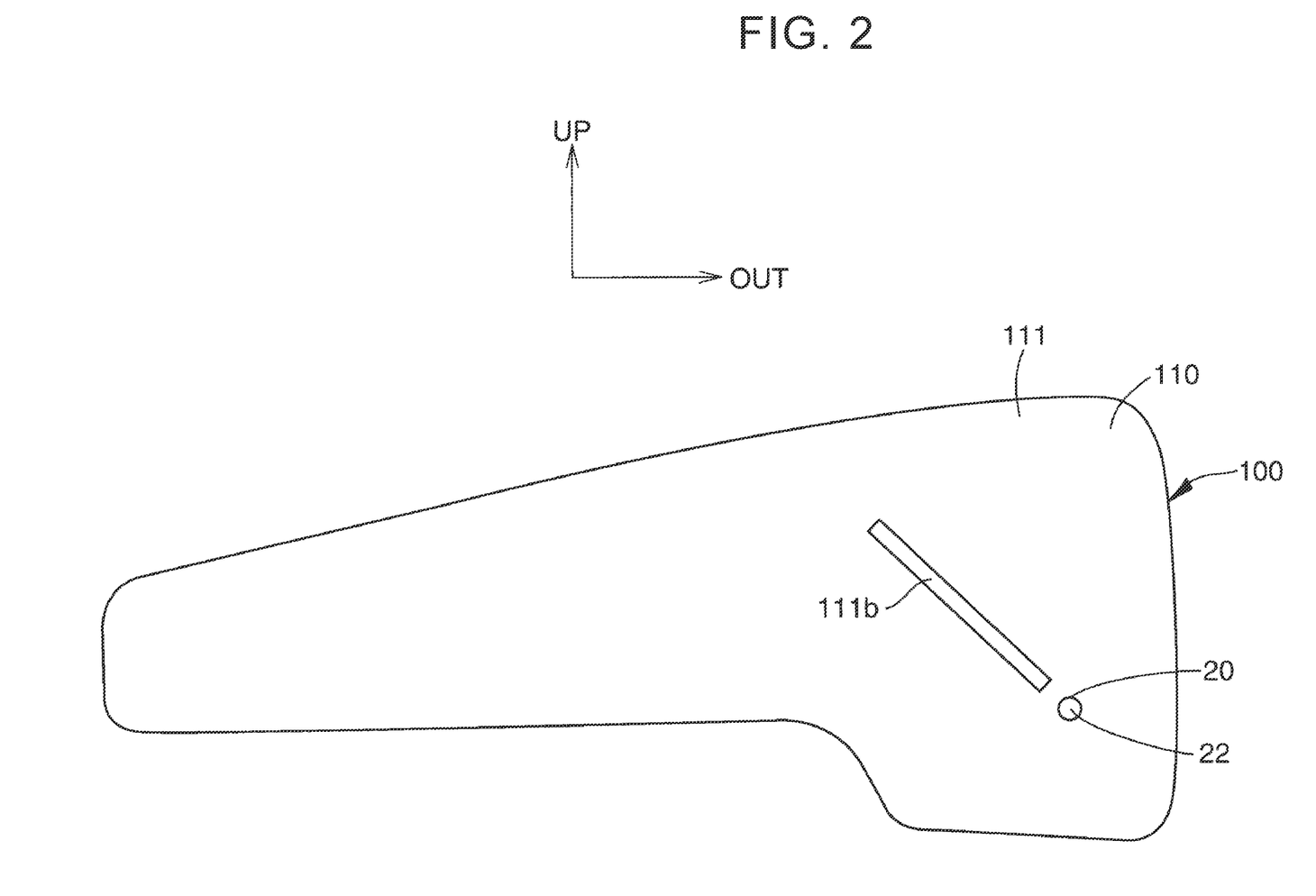
FIG. 2 is a schematic rear view of the optical axis adjustment device of the embodiment of the disclosure before the aiming guide is mounted to the headlamp.

An optical axis adjustment device (hereinafter simply referred to as a device) of the embodiment of the disclosure is a device that adjusts an optical axis of each headlamp 100 of the vehicle in a lateral direction and has an aiming screw 20 and an aiming guide 30 as shown in FIG. 1.

Figure 3:
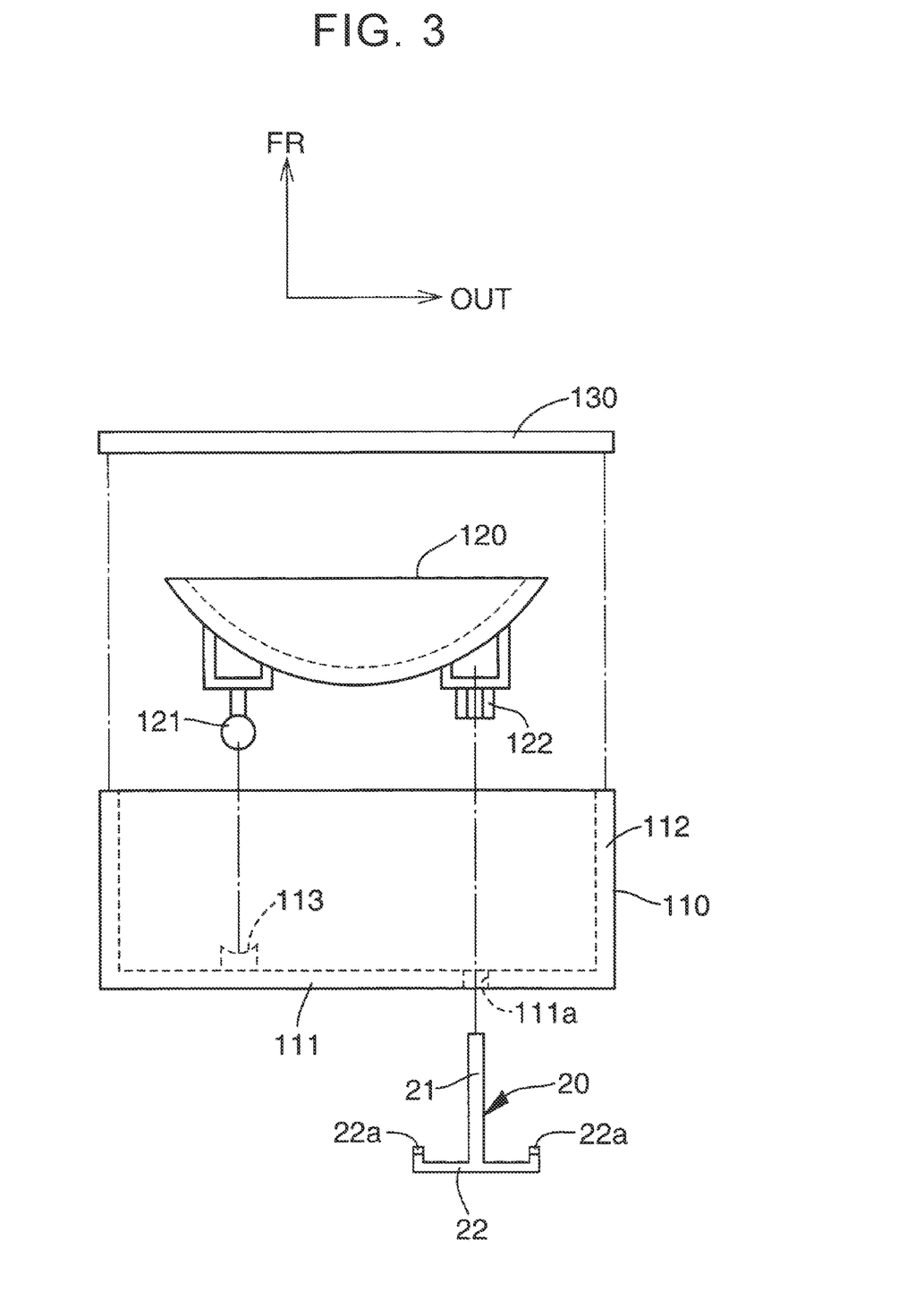
FIG. 3 is a schematic exploded plan view of the headlamp in a state shown in FIG. 2.

The headlamp 100 is disposed on both end portions of the vehicle in the vehicle width direction on a vehicle front end portion. As shown in FIG. 3, the headlamp 100 has a housing 110, a reflecting mirror (which can also be called a reflector) 120, and a lens 130.

The housing 110 is made of resin, for example. The housing 110 has a rear wall 111 and a side wall 112 that extends from a peripheral portion of the rear wall 111I toward the front of the vehicle, and is open toward the front of the vehicle.

The reflecting mirror 120 is provided inside the housing 110, and reflects light from a light source not shown to direct the light forward of the vehicle. A pivot pin 121 is provided on an end portion of the reflecting mirror 120 in a vehicle lateral direction. The pivot pin 121 extends toward the rear of the vehicle, and an end portion of the pivot pin 121 facing the rear side of the vehicle has a spherical shape. The pivot pin 121 is rotatably/pivotably supported by a pivot receiving portion 113 provided in the housing 110. A nut 122, on which an internal screw is formed, is fixed and mounted to the other end portion of the reflecting mirror 120 in the vehicle lateral direction.

The aiming screw 20 is provided at a position of the housing 110 that corresponds to the rear of the nut 122. The aiming screw 20 has a shaft portion 21 and an operation portion 22.

The shaft portion 21 extends in the front-rear direction of the vehicle. The shaft portion 21 extends from inside the headlamp 100 through a through hole 111a that is provided in the rear wall 111 of the housing 110 toward the rear of the vehicle and to outside the headlamp 100. The shaft portion 21 is rotatably supported by the housing 110 without being moved in the front-rear direction of the vehicle, which is an axial direction of the shaft portion 21, with respect to the housing 110. An external screw that is threaded into the internal screw of the nut 122 is formed on the shaft portion 21.

Figure 4:
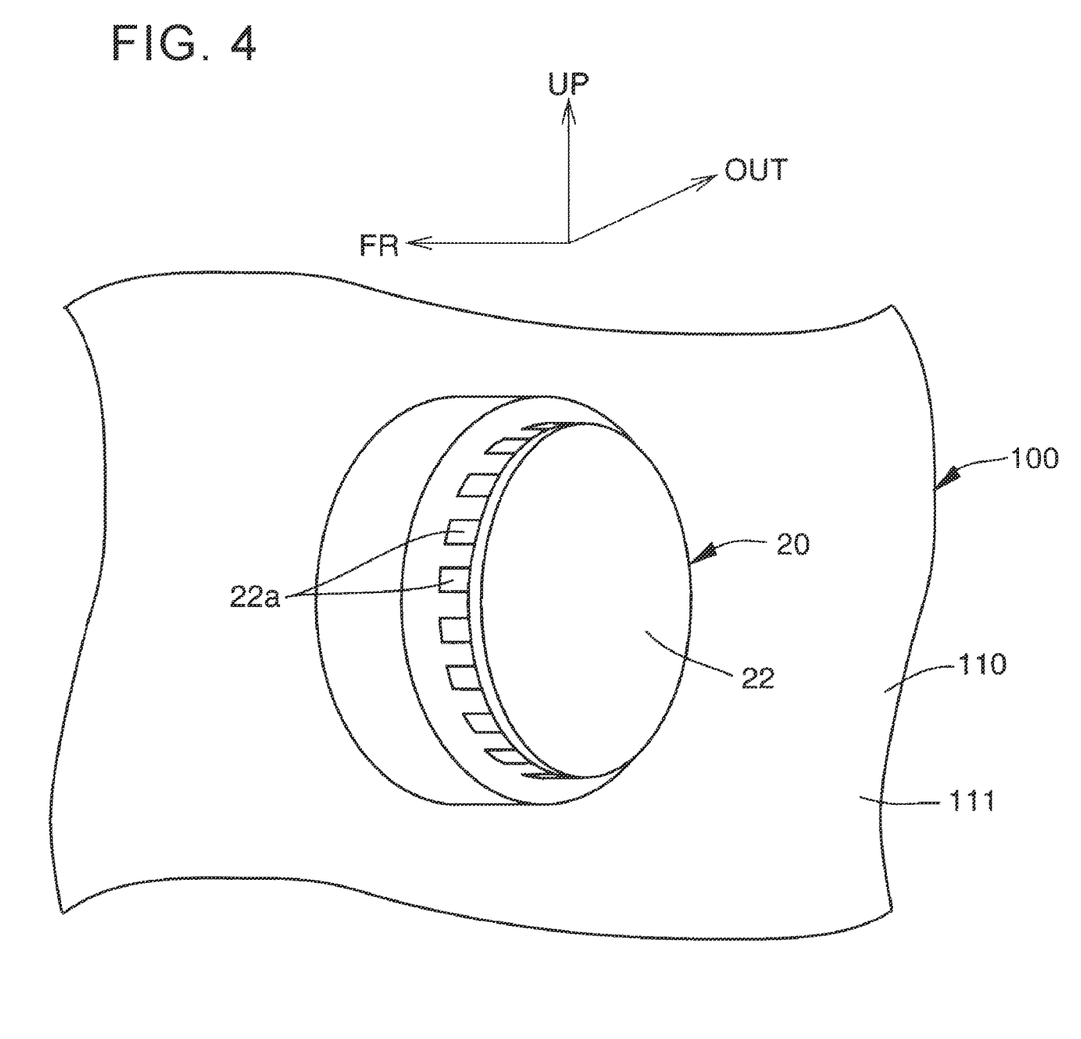
FIG. 4 is an enlarged perspective view of an operation portion of the aiming screw and the vicinity thereof in the state shown in FIG. 2.
Figure 5:
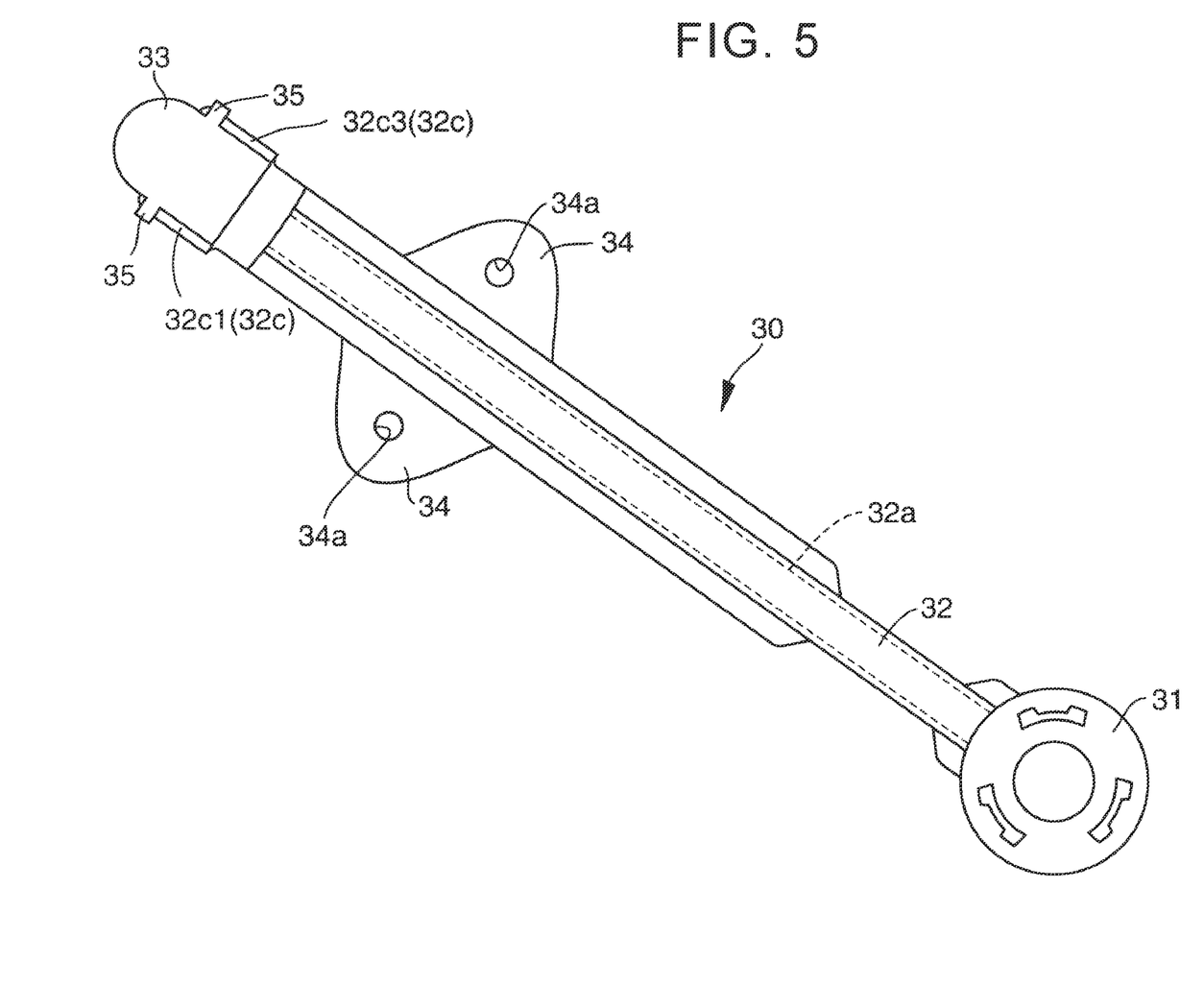
FIG. 5 is a front view of the aiming guide of the optical axis adjustment device of the embodiment of the disclosure.

The operation portion 22 is provided by being fixed to an end portion of the shaft portion 21 facing the rear side of the vehicle. The operation portion 22 may be formed integrally with the shaft portion 21, or may be formed separately from the shaft portion 21 and fixed to the shaft portion 21. The operation portion 22 is positioned outside the headlamp 100. The operation portion 22 is composed of a gear, and teeth 22a of the gear are formed on a vehicle front side surface of the operation portion 22 that faces the rear wall 111 of the housing 110 from the vehicle rear side with a clearance. The teeth 22a of the operation portion 22 are able to be meshed with a tool 40 composed of a Phillips head screwdriver etc.

When the tool 40 is rotated around the axis of the tool 40 while the tool 40 is meshed with the teeth 22a, the aiming screw 20 is rotated. Thus, due to action of the external screw of the aiming screw 20 and the internal screw of the nut 122, the nut 122 moves in the front-rear direction of the vehicle with respect to the aiming screw 20. As a result, the reflecting mirror 120 rotates (pivots) in the lateral direction of the vehicle with the pivot pin 121 and the pivot receiving portion 113 as the center, and the optical axis of the headlamp 100 is adjusted in the lateral direction of the vehicle.

The aiming guide 30 is made from resin and is formed by molding. The aiming guide 30 may be formed of one part or may be formed of a plurality of parts. As shown in FIG. 1, the aiming guide 30 is disposed outside the headlamp 100, and is mounted on the rear wall 111 of the housing 110 of the headlamp 100. The aiming guide 30 has a cover portion 31, a guide portion 32, a locking cap portion 33, and mounting portions 34.

The cover portion 31 has a bottomed cylindrical shape that opens toward the front of the vehicle and covers the operation portion 22 of the aiming screw 20 from the rear side of the operation portion 22 in the front-rear direction of the vehicle. It is possible to suppress the operation portion 22 of the aiming screw 20 from being exposed, since the cover portion 31 covers the operation portion 22 of the aiming screw 20. A vehicle front side end portion of the cover portion 31 may be or may not be in contact with the rear wall 111 of the housing 110.

The guide portion 32 is provided extending linearly vertically upward or obliquely upward from the cover portion 31. An end portion of the guide portion 32 away from the cover portion 31, that is, an end portion on the opposite side of the guide portion 32 from the cover portion 31 is positioned on an upper portion of the headlamp 100. The upper portion of the headlamp 100 includes an upper end portion of the headlamp 100 and is an upper half of the headlamp 100 when the headlamp 100 is divided into two parts in the up-down direction.

Figure 7:
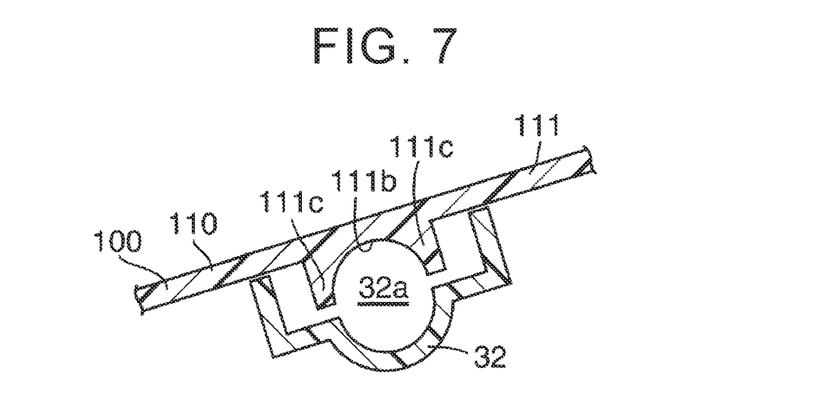
FIG. 7 is an enlarged sectional view taken along line A-A in FIG. 1, when a tool insertion space of a guide portion is a space between an outer surface of the headlamp and the guide portion.
Figure 8:
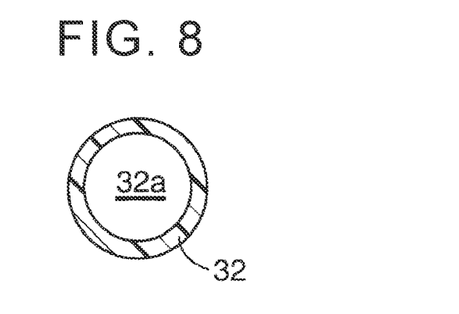
FIG. 8 is an enlarged sectional view taken along line A-A in FIG. 1, when the tool insertion space of the guide portion is a space formed by only the guide portion that has a closed cross section in a cross sectional view.

A tool insertion space 32a, in which the tool 40 can be inserted, is provided inside the guide portion 32. As shown in FIG. 7, the tool insertion space 32a may be a space formed by collaboration between the guide portion 32 and a recessed portion 111b formed on the rear wall 111 of the housing 110 of the headlamp 100. The tool insertion space 32a may also be a space formed by only the guide portion 32 that is a closed cross section in a cross sectional view, as shown in FIG. 8. The recessed portion 111b on the rear wall 111 of the headlamp 100 may be formed by providing a recess that is recessed in the rear wall 111 toward the front of the vehicle. A pair of ribs 111c that project from the rear wall 111 toward the rear of the vehicle may be provided and a space between the ribs 111c may be used as the recessed portion 111b. The tool insertion space 32a is in communication with an inner space of the cover portion 31, and is formed to extend from the inner space of the cover portion 31 along the guide portion 32. An end of the guide portion 32 away from the cover portion 31 defines an opening 32b.

Figure 10:
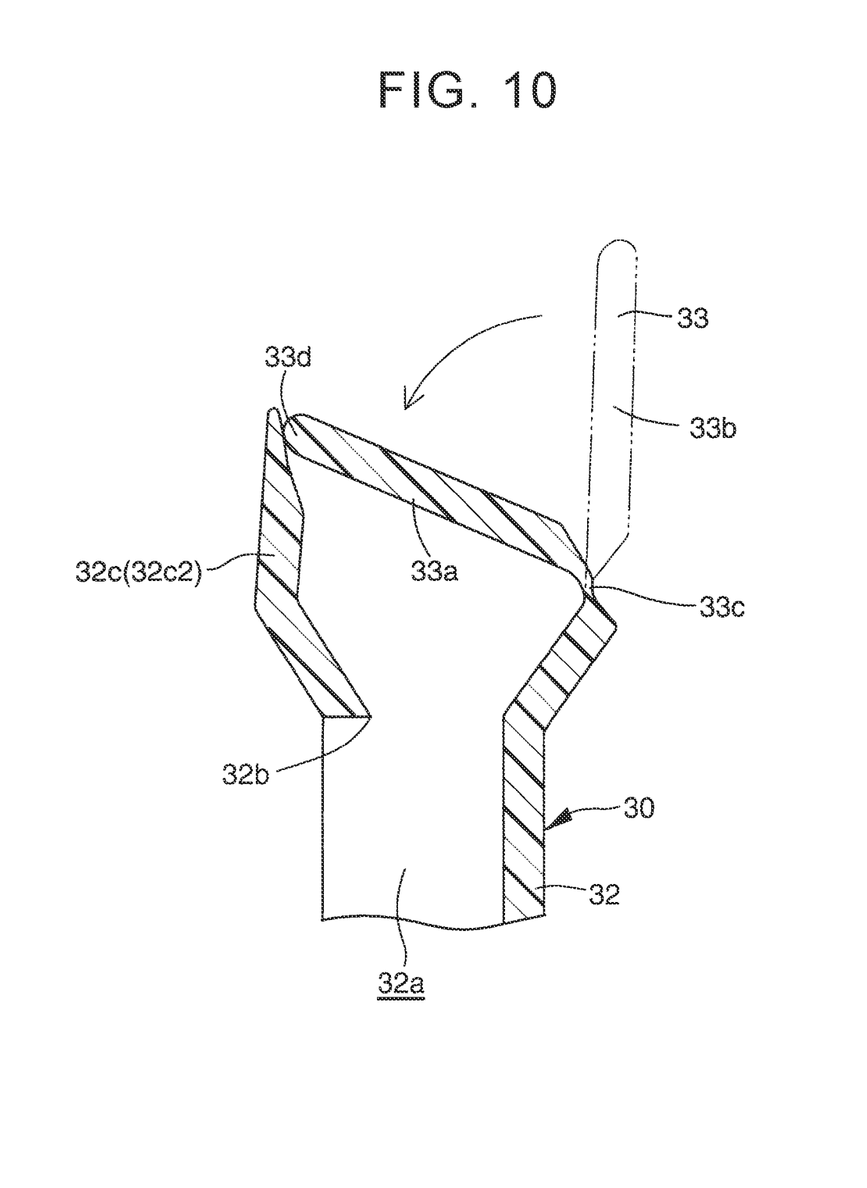
FIG. 10 is a partially enlarged sectional view illustrating the relationship between a second protruding piece and the locking cap portion of the optical axis adjustment device according the embodiment of the disclosure.

As shown in FIG. 10, the locking cap portion 33 is provided on the end portion (upper end portion) of the guide portion 32 away from the cover portion 31. The locking cap portion 33 is integral with the guide portion 32 and is joined with the guide portion 32 by integral hinging. The locking cap portion 33 is rotatable with an integral hinge 33c as the center with respect to the guide portion 32. The locking cap portion 33 is rotatable with respect to the guide portion 32, to a closed state 33a in which the opening 32b of the tool insertion space 32a is covered from above, and to an open state 33b in which the locking cap portion 33 is rotated upwards from the closed state 33a and the opening 32b of the tool insertion space 32a is opened. A rotation angle of the locking cap portion 33 from the open state 33b to the closed state 33a is less than 90 degrees, such as 60 degrees plus or minus 15 degrees, in order to suppress resin of the integral hinge 33c from whitening.

Figure 6:
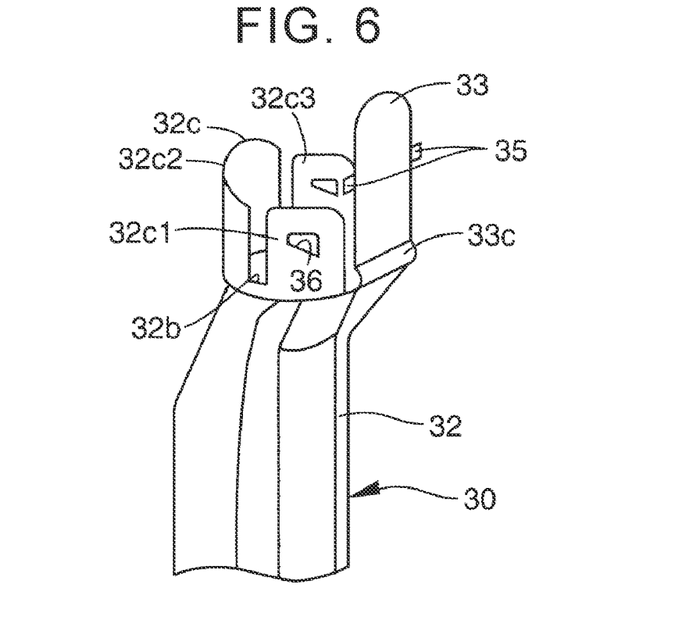
FIG. 6 is an enlarged perspective view of the locking cap portion of the optical axis adjustment device according to the embodiment of the disclosure and the vicinity thereof.

As shown in FIG. 6, in the locking cap portion 33, the closed state 33a is maintained by engaging tabs 35 that are provided on the locking cap portion 33 with tab receivers 36 that are provided on the guide portion 32. Although not shown, the tab receivers 36 may be provided on the locking cap portion 33 and the tabs 35 may be provided on the guide portion 32.

The guide portion 32 has a protruding piece 32c that protrudes from a peripheral portion of the opening 32b away from the cover portion 31. The tab receivers 36 are provided on the protruding piece 32c. The protruding piece 32c has first, second, and third protruding pieces 32c1, 32c2, 32c3 along the peripheral portion of the opening 32b in this order. The first and third protruding pieces 32c1, 32c3 have a flat plate shape or a generally flat plate shape and are provided facing each other. The tab receivers 36 are provided on the first and third protruding pieces 32c1, 32c3. The tab receivers 36 may be through holes that pass through the first and third protruding pieces 32c1, 32c3 or may be recessed portions that are provided on the first and third protruding pieces 32c1, 32c3.

Figure 9:
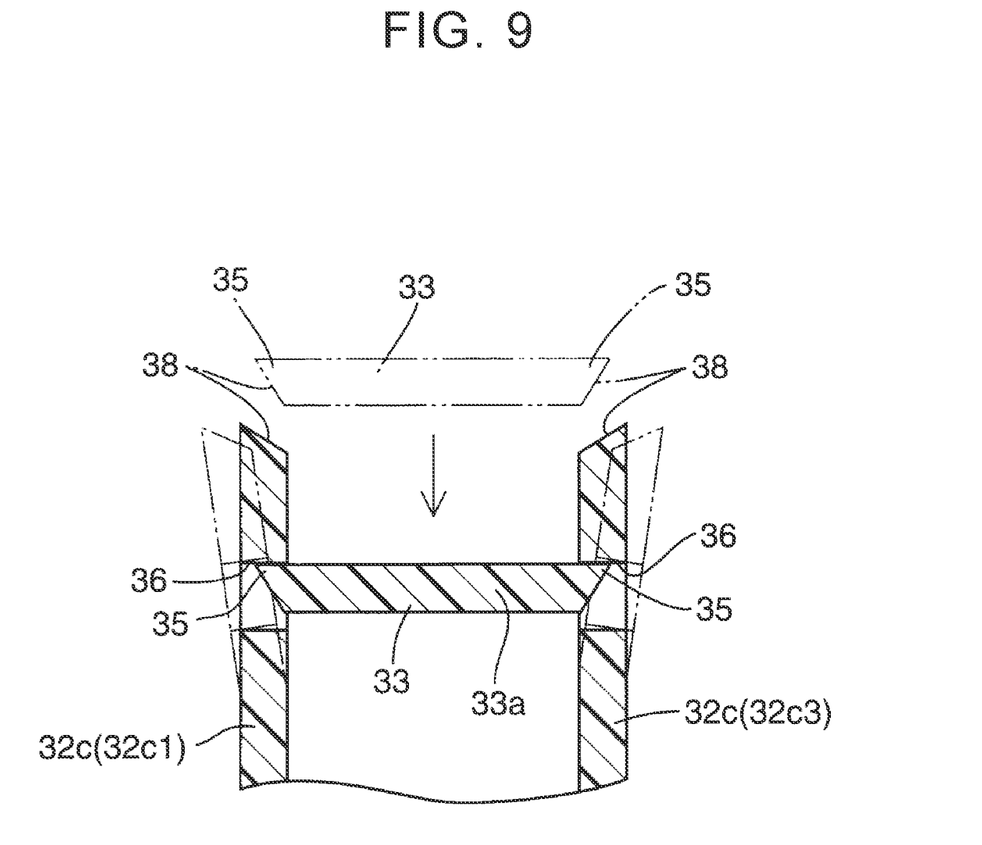
FIG. 9 is a partially enlarged sectional view illustrating the relationship between tabs and tab receivers of the optical axis adjustment device according to the embodiment of the disclosure.

As shown in FIG. 9, the locking cap portion 33 is closed by deflecting and pushing away the first and third protruding pieces 32c1, 32c3 with the tabs 35. When the locking cap portion 33 reaches the closed state 33a, the tabs 35 enter the tab receivers 36 while the first and third protruding pieces 32c1, 32c3 are restored to their original positions by their own resin elasticity. Thus, the tabs 35 and the tab receivers 36 are engaged. Inclined surfaces 38 may be provided on the tabs 35 and/or the first and third protruding pieces 32c1, 32c3, so that the first and third protruding pieces 32c1, 32c3 can be easily deflected and pushed away by the tabs 35 when the locking cap portion 33 is being closed.

The tab receivers 36 are not provided on the second protruding piece 32c2. As shown in FIG. 10, the second protruding piece 32c2 is positioned ahead of an end portion 33d of the locking cap portion 33 in the closed state 33a. The end portion 33d is on the opposite side of the locking cap portion 33 from a side on which the locking cap portion 33 is joined with the guide portion 32 by integral hinging. The end portion 33d of the locking cap portion 33 in the closed state 33a may or may not be in contact with the second protruding piece 32c2.

As shown in FIG. 1, the mounting portions 34 are provided for mounting the aiming guide 30 to the rear wall 111 of the housing 110. The mounting portions 34 are not specifically limited thereto, but a pair of the mounting portions 34 is provided extending from an intermediate portion of the guide portion 32 in a longitudinal direction to both sides of the guide portion 32 in a lateral direction. A hole 34a that passes through the mounting portion 34 is formed on each mounting portion 34. The mounting portions 34 are each fixed and mounted to the rear wall 111 of the housing 110 by inserting a screw etc., not shown, in the hole 34a and mounting the mounting portion 34 to the rear wall 111 of the housing 110.

A case in which the tool 40 is used to adjust the optical axis at a vehicle factory will be described.

(i) The first and third protruding pieces 32c1, 32c3 are deflected to remove the tabs 35 from the tab receivers 36, and the locking cap portion 33 is rotated around the integral hinge 33c from the closed state 33a to the open state 33b.

(ii) The tool 40 is inserted in the tool insertion space 32a from the opening 32b to access the operation portion 22 of the aiming screw 20, so that the tool 40 is meshed with the teeth 22a. Meshing of the tool 40 and the teeth 22a of the operation portion 22 is achieved naturally by just inserting the tool 40 in the tool insertion space 32a so that the tool 40 accesses the operation portion 22.

(iii) The tool 40 is rotated around the axis of the tool 40 while the tool 40 is meshed with the teeth 22a of the operation portion 22 to rotate the aiming screw 20 so that the optical axis of the headlamp 100 is adjusted in the lateral direction of the vehicle.

(iv) After the optical axis is adjusted, the tool 40 is removed from the tool insertion space 32a, the locking cap portion 33 in the open state 33b is rotated to be in the closed state 33a, and the tabs 35 are engaged with the tab receivers 36. Thus, the optical axis adjustment operation is completed.

Next, the functions and effects of the embodiment will be described.

(A) (a) The aiming guide 30 is provided and the aiming guide 30 has the cover portion 31 that covers the operation portion 22 of the aiming screw 20. Thus, it is possible to suppress the operation portion 22 of the aiming screw 20 from being exposed. Therefore, it is possible to make it difficult for the user to operate the aiming screw 20 and adjust the optical axis in the lateral direction.

(b) The aiming guide 30 has the cover portion 31 that covers the operation portion 22 of the aiming screw 20, and the guide portion 32 that has the tool insertion space 32a inside and that is provided extending linearly from the cover portion 31. Thus, it is possible for the tool 40 to access the operation portion 22 of the aiming screw 20 only through the guide portion 32.

(c) The aiming guide 30 has the locking cap portion 33 that is provided on the end portion of the guide portion 32 away from the cover portion 31 and that is able to cover the opening 32b of the tool insertion space 32a. Thus, at the vehicle factory, after the optical axis is adjusted by the tool 40 accessing the aiming screw 20 through the tool insertion space 32a of the guide portion 32, the locking cap portion 33 is closed and the opening 32b of the tool insertion space 32a is covered by the locking cap portion 33. Therefore, it is possible to restrain the user from accessing the aiming screw 20. According to (a) to (c) of the above, with the locking cap portion 33, it is possible to restrain the user from accessing the aiming screw 20 even when the aiming screw 20 is disposed. Thus, the optical axis adjustment device 10 can be provided with more consideration given to the FMVSS compared to a device of the related art.

(B) The locking cap portion 33 is joined with the guide portion 32 by integral hinging. Thus, compared to the case where the locking cap portion 33 is formed separately from the guide portion 32, it is possible to not just reduce the number of assembly parts of the device 10, but also restrain the locking cap portion 33 from falling off the guide portion 32.

(C) The guide portion 32 has the protruding piece 32c. Therefore, it is possible to protect the locking cap portion 33 in the closed state 33a from its surroundings with the protruding piece 32c. This can suppress the closed state 33a of the locking cap portion 33 from being released by outer force applied to the locking cap portion 33 in the closed state 33a.

(D) The tabs 35 are provided on one of the locking cap portion 33 and the protruding piece 32c of the guide portion 32. The tab receivers 36 which can be engaged with the tabs 35 are provided on the other of the locking cap portion 33 and the protruding piece 32c of the guide portion 32. Thus, it is possible to maintain the closed state 33a of the locking cap portion 33 by just engaging the tabs 35 with the tab receivers 36. Therefore, it is possible to maintain the closed state 33a of the locking cap portion 33 with a simple configuration. Additionally, since the tabs 35 or the tab receivers 36 are provided on the protruding piece 32c, the tabs 35 and the tab receivers 36 can be engaged by deflecting the protruding piece 32c, and the tabs 35 and the tab receivers 36 can be easily engaged.

(E) The protruding piece 32c has the first, second, and third protruding pieces 32c1, 32c2, 32c3. The tabs 35 or the tab receivers 36 are provided on the first and third protruding pieces 32c1, 32c3 that are provided so as to face each other. Thus, it is possible to engage the locking cap portion 33 with the protruding piece 32c at both right and left sides of the locking cap portion 33 and therefore perform engagement surely and firmly. The second protruding piece 32c2 is positioned ahead (in front of) the end portion 33d of the locking cap portion 33 in the closed state 33a. Thus, it is possible to protect the end portion 33d of the locking cap portion 33 in the closed state 33a with the second protruding piece 32c2, and the locking cap portion 33 can be made more difficult to open compared to the case where the second protruding piece 32c2 is not provided.

(F) The guide portion 32 is provided extending vertically upward or obliquely upward from the cover portion 31. Thus, not only is it possible to dispose the locking cap portion 33 on the upper portion of the headlamp 100, it is also possible to open the tool insertion space 32a of the guide portion 32 vertically upward or obliquely upward. This facilitates access to the locking cap portion 33 by an operator at the vehicle factory, as well as allows the tool 40 to be inserted in the tool insertion space 32a from vertically upward or obliquely upward. Thus, workability of the optical axis adjustment operation at the vehicle factory can be improved.

(G) The aiming guide 30 has the mounting portions 34 for mounting the aiming guide 30 to the headlamp 100. Thus, it is possible to suppress the aiming guide 30 from falling off the headlamp 100.

Modification of the Embodiment of the Disclosure

Figure 11:
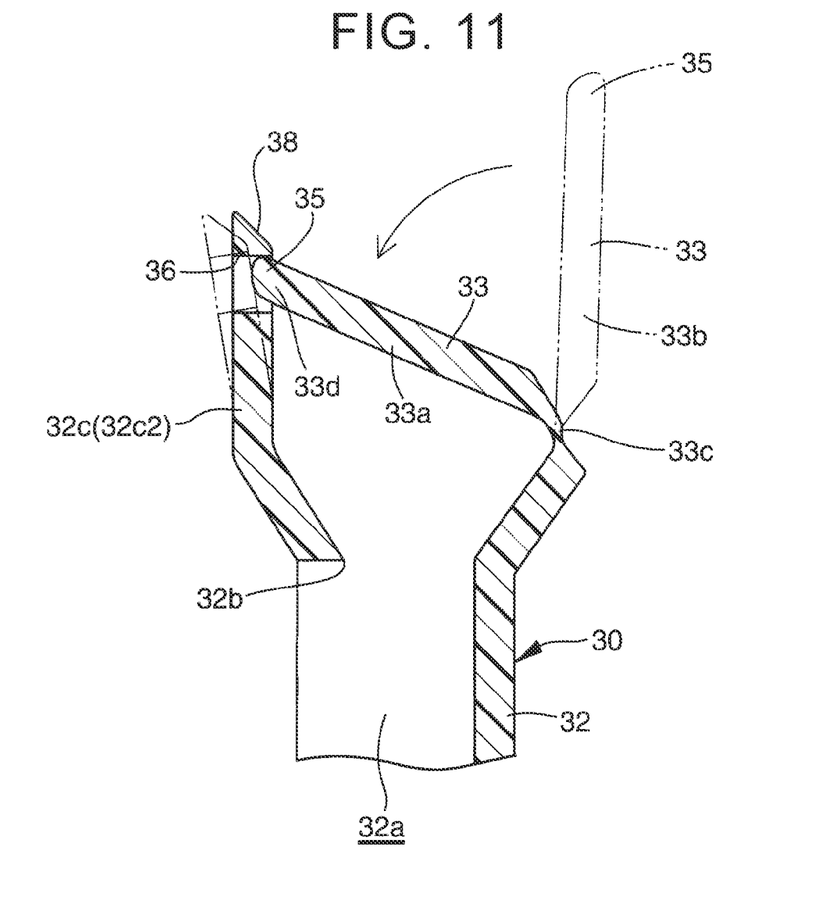
FIG. 11 is a diagram illustrating a modification of the optical axis adjustment device of the embodiment of the disclosure and is a partially enlarged sectional view illustrating the relationship between the tab and the tab receiver when the tab receiver is provided on the second protruding piece.
Figure 12:
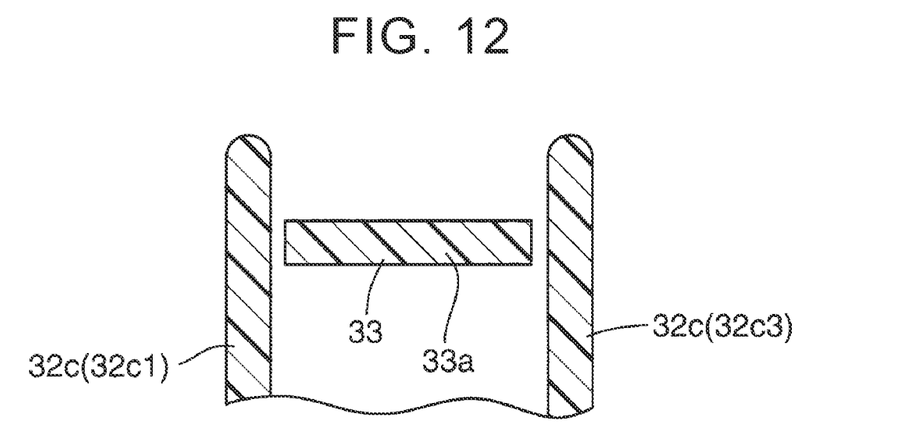
FIG. 12 is a partially enlarged view illustrating the relationship between a first and third protruding pieces and the locking cap portion in the case illustrated in FIG. 11.

Next, a modification of the embodiment of the disclosure will be described. In the embodiment of the disclosure described above, a case in which the tab receivers 36 are provided on the first and third protruding pieces 32c1, 32c3 and the tab receiver 36 is not provided on the second protruding piece 32c2 was described. However, in the modification of the embodiment of the disclosure, the tab receiver 36 is provided on the second protruding piece 32c2 of the protruding piece 32c and the tab receivers 36 are not provided on the first and third protruding pieces 32c1, 32c3 of the protruding piece 32c, as shown in FIGS. 11 and 12. Similar to the embodiment described above, the tabs 35 may be provided on the protruding piece 32c and the tab receivers 36 may be provided on the locking cap portion 33.

The second protruding piece 32c2 is positioned ahead of the end portion 33d of the locking cap portion 33 in the closed state 33a. The end portion 33d is on the opposite side of the locking cap portion 33 from the side on which the locking cap portion 33 is joined with the guide portion 32 by integral hinging. The tab receiver 36 may be a through hole that passes through the second protruding piece 32c2 or may be a recessed portion that is provided on the second protruding piece 32c2.

As shown in FIG. 11, the locking cap portion 33 is closed by deflecting and pushing away the second protruding piece 32c2 with the tab 35. When the locking cap portion 33 reaches the closed state 33a, the tab 35 enters the tab receiver 36 while the second protruding piece 32c2 is restored to its original position by its own resin elasticity. Thus, the tab 35 and the tab receiver 36 are engaged. The inclined surface 38 may be formed on the tab 35 and/or the second protruding piece 32c2 so that the second protruding piece 32c2 can be easily deflected and pushed away by the tab 35 when the locking cap portion 33 is being closed.

As shown in FIG. 12, the tab receiver 36 is not provided on the first and third protruding pieces 32c1, 32c3. The first and thirst protruding pieces 32c1, 32c3 are positioned on both right and left sides of the locking cap portion 33 in the closed state 33a.

In the modification of the embodiment of the disclosure, the following functions and effects can be obtained. The tab 35 or the tab receiver 36 is provided on the second protruding piece 32c2 that is positioned ahead of the end portion 33d of the locking cap portion 33. Thus, the locking cap portion 33 can be engaged with the protruding piece 32c by the end portion 33d of the locking cap portion 33. Therefore, only one tab 35 needs to be engaged with one tab receiver 36, and it is possible to suppress a state in which only the tab 35 and the tab receiver 36 on one side are engaged, as is not the case in which the tabs 35 and the tab receivers 36 are provided on both right and left sides of the locking cap portion 33. Additionally, the first and third protruding pieces 32c1, 32c3 are positioned on both sides (both right and left sides) of the locking cap portion 33 in the closed state 33a. Thus, the locking cap portion 33 in the closed state 33a can be protected by the first and third protruding pieces 32c1, 32c3 and the locking cap portion 33 can be made more difficult to open compared to the case where the first and third protruding pieces 32c1, 32c3 are not provided.

What is claimed is:

1. An optical axis adjustment device that adjusts an optical axis of a headlamp, the optical axis adjustment device comprising:
    an aiming screw that is provided extending from inside to outside the headlamp and that has an operation portion outside the headlamp; and
    an aiming guide, the aiming guide being disposed outside the headlamp and having:
        a cover portion that covers the operation portion of the aiming screw;
        a guide portion that has a tool insertion space inside and that is provided extending linearly from the cover portion; and
        a locking cap portion that is provided on an end portion of the guide portion away from the cover portion and that is configured to cover an opening of the tool insertion space.

2. The optical axis adjustment device according to claim 1, wherein the locking cap portion is integral with the guide portion and is joined with the guide portion by integral hinging.

3. The optical axis adjustment device according to claim 1, wherein the guide portion has a protruding piece that protrudes from a peripheral portion of the opening away from the cover portion.

4. The optical axis adjustment device according to claim 3, wherein a tab is provided on one of the locking cap portion and the protruding piece of the guide portion, and a tab receiver configured to be engaged with the tab is provided on the other of the locking cap portion and the protruding piece of the guide portion.

5. The optical axis adjustment device according to claim 4, wherein:

the protruding piece has first, second, and third protruding pieces along the peripheral portion of the opening in this order; and among the first, second, and third protruding pieces, the first and third protruding pieces are provided so as to face each other and are provided with the tab or the tab receiver, and the second protruding piece is positioned ahead of an end portion of the locking cap portion in a closed state, the end portion being on an opposite side of the locking cap portion from a side on which the locking cap portion is joined with the guide portion by integral hinging.

6. The optical axis adjustment device according to claim 4, wherein:

the protruding piece has first, second, and third protruding pieces along the peripheral portion of the opening in this order; and among the first, second, and third protruding pieces, the second protruding piece is positioned ahead of an end portion of the locking cap portion in a closed state, the end portion being on an opposite side of the locking cap portion from a side on which the locking cap portion is joined with the guide portion by integral hinging, and is provided with the tab or the tab receiver, and the first and third protruding pieces are provided facing each other and are positioned on both sides of the locking cap portion in the closed state.

7. The optical axis adjustment device according to claim 1, wherein the guide portion is provided extending vertically upward or obliquely upward from the cover portion.

8. The optical axis adjustment device according to claim 1, wherein the aiming guide has a mounting portion for mounting the aiming guide to the headlamp.

9. The optical axis adjustment device according to claim 1, wherein the optical axis adjustment device is configured to adjust the optical axis of the headlamp in a lateral direction of a vehicle.

* * * * *

UNITED STATES PATENT AND TRADEMARK OFFICE
CERTIFICATE OF CORRECTION

PATENT NO. : 10,640,032 B2  
APPLICATION NO. : 16/223814  
DATED : May 5, 2020  
INVENTOR(S) : Ko Mizuguchi Page 1 of 1

It is certified that error appears in the above-identified patent and that said Letters Patent is hereby corrected as shown below:

On the Title Page

Item (72), inventor city, delete "Nisshin" and insert --Nisshin-shi Aichi-ken--, therefor.

In the Specification

In Column 5, Line 5, before "of the embodiment", insert --10--.

In Column 5, Line 17, after "rear wall", delete "111I" and insert --111--, therefor.

Signed and Sealed this  
Twenty-third Day of June, 2020

Andrei Iancu  
*Director of the United States Patent and Trademark Office*